Patented Mar. 5, 1940

2,192,347

UNITED STATES PATENT OFFICE 2,192,347

INSECTICIDE

Mark L. Hill, Yeadon, and Bassett Ferguson, Jr., Ridley Park, Pa., assignors to Gulf Oil Corporation, Pittsburgh, Pa., a corporation of Pennsylvania No Drawing. Application February 1, 1937,
Serial No. 123,522

7 Claims. (Cl. 167—22)

This invention relates to insecticides and more particularly to insecticidal sprays comprising a suitable hydrocarbon oil base, a small amount of para-tertiary-amyl-phenol, with or without an additional toxicant, such as butyl carbitol thiocyanate, and in most cases, a secondary solvent, including especially, secondary butyl carbitol, di-butyl phthalate, ethyl alcohol, ortho dichlorbenzene and the like; all as more fully hereinafter set forth and as claimed.

In the manufacture of insecticidal sprays, suitable for use against ordinary house flies and similar household pests, certain considerations are of importance. In the first place, such sprays must be highly toxic to insect life, while non-toxic and non-irritating to human beings and to ordinary domestic animals. It is also desirable to provide sprays which are stable to light and moisture, and as free as possible from disagreeable odor. When such sprays are to be used as cattle sprays or the like, the insect-repellent value is of greater importance, although this is also a desirable property for household sprays.

Heretofore it has been common to use various toxicants found in nature derived from plants or the like. Thus pyrethrum extracts and rotenone or derris extracts have been commonly used in the manufacture of insecticidal sprays. However, these toxicants have been found to be somewhat limited in insecticidal value in proportion to cost, as well as unstable to light and moisture, and the available plants do not always produce quantities of toxicants sufficient for practical extraction. Various synthetic materials have also been employed, but, in general, the use of these materials in amounts sufficient to obtain the desired toxicity has resulted in imparting to the spray compositions a very unpleasant odor.

We have found that para-tertiary-amyl-phenol, when incorporated in an odorless kerosene or similar spray base by means of certain secondary solvents, produces a colorless and almost odorless insecticide which is extremely effective against the ordinary house fly (*Musca domestica*). Such compositions are strongly repellent not only with respect to the ordinary house fly but also against blue bottle flies (*Chrysomia Macellera*, Hum) clothes moths (*Tineola bisellialla*) and the like. We have found that para-tertiary-amyl-phenol is not harmful to human tissue and that it is not toxic or irritating to warm-blooded animals.

Para-tertiary-amyl-phenol is a compound which may be represented by the following structural formula:

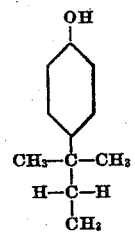

We have used a commercial product having the following properties:

| | |
|---|---|
| Molecular weight | 164 |
| Specific gravity at 95° C. | 0.91 to 0.94 |
| Softening point °C. | Not less than 79 |
| Final melting point °C. | Not less than 87 |
| Distillation | 95% from 250° to 265° C. |
| Water content | None |
| Flash point °F. | 256 |
| Non-volatile matter | Not over 0.001 |
| Phenol coefficient (hygiene laboratories method) | 60 |

Para-tertiary-amyl-phenol is insoluble in water and it is practically insoluble in highly refined naphtha or kerosene. We found that not more than inconsiderable amounts of this compound could be incorporated in commonly used insecticide spray bases. We have found, however, that permanently miscible solutions of suitable strength may be prepared by first dissolving para-tertiary-amyl-phenol in certain solvents and then mixing the solution thus obtained with naphtha, kerosene and similar insecticidal spray bases. The secondary solvents which we have found most suitable for our purpose are secondary butyl carbitol, di-butyl phthalate, ethyl alcohol, and ortho-di-chlorbenzene, although acetone and some other secondary solvents may be employed in certain instances.

Our invention contemplates the use of para-tertiary-amyl-phenol, either as the sole toxicant or in conjunction with other materials having insecticidal properties, such as butyl carbitol thiocyanate and also pyrethrum extracts, rotenone or derris extracts, deguelin, tephrosin and the like. Thus, para-tertiary-amyl-phenol may be used as a substitute for other and higher priced toxicants or to augment other insecticides, such as those of lower kill power, including the marc or residue of pyrethrum extracts, in preparing insecticidal sprays. Thus we have found that the addition of 2 per cent of para-tertiary-amyl-phenol to a solution of pyrethrum-rotenone extract in a kerosene base increases the kill of the original insecticide mixture from 45 to 65 per cent.

The use of para-tertiary-amyl-phenol in conjunction with butyl-carbitol thiocyanate is especially advantageous, in that the latter compound, in addition to being an insecticide itself, also serves as a secondary solvent to hold the former in solution, up to a certain amount, in a naphtha or kerosene base. With this combination, the use of a secondary solvent is not always required.

In general, we have found that the addition of para-tertiary-amyl-phenol in amounts equal to from 2 per cent to 5 per cent of a spray base are effective for our purposes, although higher percentages, for example up to 10 per cent, may be employed if desired.

In the preparation of insecticidal sprays, we find it advantageous in most cases to dissolve para-teritary-amyl-phenol in the minimum quantity of secondary solvent, and then to add this solvent mixture to a naphtha or kerosene base up to the concentration desired. The secondary solvent should, of course, be one which dissolves a substantial amount of para-tertiary-amyl-phenol and which will not only be soluble in a hydro-carbon oil such as naphtha, kerosene and the like, but which will hold the para-tertiary-amyl-phenol in solution in the base.

In the examples given below the effectiveness of various insecticidal sprays prepared in accordance with our invention was determined by means of a uniform test procedure. A description of this procedure follows:

Ordinary house flies are bred according to the standard Peet-Grady method, described on page 92 of "Pyrethrum Flowers" by C. B. Gnadinger, 1936. Five-day-old-flies were used for the test, as these show the maximum vitality for the species.

The test apparatus consists of a five gallon glass container fitted with a ground joint on a glass plate. An atomizer is inserted through the top of the container for the introduction of the spray. The glass plate is covered with paper and from 50 to 100 flies are placed in the gas chamber. The atomizer is then placed in position and adjusted to 12.5 pounds pressure, after which exactly 0.20 cc. of the insecticidal spray being tested is blown through the atomizer into the chamber, enveloping the flies contained therein. After 30 seconds the spray is removed and the top of the container is covered with a glass plate. The flies remain in this atmosphere for a period of 10 minutes. The number down at the end of that time are placed in an observation cage with food, as described under the Peet-Grady method mentioned above. The test is correlated against a standard sample established by tests in the article referred to above.

The following examples show the physical properties and potencies of a number of insecticidal compositions consisting of mixtures of an insecticide, a spray base (naphtha), para-tertiary-amyl-phenol and various secondary solvents, as well as in some instances a secondary insecticidal material.

| Make-up, percent by weight | I | II | III |
|---|---|---|---|
| Paratertiaryamylphenol | 2.0 | 2.5 | 4.6 |
| 20:1 pyrethrum-rotenone extract | 4.0 | | |
| Dibutylphthalate | 1.5 | 1.5 | |
| 20:1 pyrethrum extract | | 2.0 | |
| Orthodichlorbenzene | | | 5.4 |
| Insecticide naphtha | 93.5 | 94.0 | 90.0 |
| Fly killing test: | | | |
| Number of tests | 10 | 12 | 10 |
| Number of flies | 932 | 893 | 915 |
| Average of tests: | | | |
| Down, 10 min. percent | 98 | 98 | 99 |
| Killed, 24 hr. percent | 68 | 67 | 81 |
| Killed and moribund, 24 hr. percent | 70 | 69 | 86 |

| Make-up, percent by weight | IV | V | VI |
|---|---|---|---|
| Paratertiaryamylphenol | 2.5 | 2.0 | 9.2 |
| Dibutylphthalate | 5.0 | | |
| 20:1 derris extract (containing rotenone, deguelin, and tephrosin) | 2.0 | | |
| Extract of 10 lb. pyrethrum marc with 1 gal. naphtha base | | 96.0 | |
| Ethanol | | 2.0 | 9.2 |
| Insecticide naphtha | 90.5 | | 81.6 |
| Fly killing test: | | | |
| Number of tests | 10 | 14 | 9 |
| Number of flies | 876 | 1130 | 700 |
| Average of tests: | | | |
| Down, 10 min. percent | 98 | 99 | 99 |
| Killed, 24 hr. percent | 70 | 69 | 96 |
| Killed and moribund, 24 hr. percent | 72 | 73 | 99 |

| Make-up, percent by weight | VII | VIII | IX | X |
|---|---|---|---|---|
| Paratertiaryamylphenol | 2.3 | 3.5 | 4.6 | 5.8 |
| Ethanol | 2.3 | 3.5 | 4.6 | 5.8 |
| Insecticide naphtha | 95.4 | 93.0 | 90.8 | 88.4 |
| Fly killing test: | | | | |
| Number of tests | 14 | 11 | 9 | 9 |
| Number of flies | 971 | 893 | 640 | 755 |
| Average of tests: | | | | |
| Down, 10 min. percent | 98 | 98 | 99 | 99 |
| Killed, 24 hr. percent | 58 | 67 | 76 | 85 |
| Killed and moribund, 24 hr. percent | 65 | 75 | 83 | 91 |

| Make-up, percent by weight | XI | XII | XIII | XIV |
|---|---|---|---|---|
| Paratertiaryamylphenol | 3.0 | 2.5 | 4.0 | 4.6 |
| "Butyl carbitol thiocyanate" | 1.0 | 1.5 | | |
| Dibutylphthalate | 0.75 | | 1.0 | 11.5 |
| Orange blend | 1.0 | | | |
| Insecticide naphtha | 94.25 | 96.0 | 95.0 | 83.9 |
| Fly killing test: | | | | |
| Number of tests | 10 | 8 | 9 | 8 |
| Number of flies | 835 | 710 | 734 | 571 |
| Average of tests: | | | | |
| Down, 10 min. percent | 99 | 99 | 99 | 99 |
| Killed, 24 hr. percent | 77 | 70 | 71 | 83 |
| Killed and moribund, 24 hr. percent | 85 | 76 | 80 | 91 |

| Make-up, percent by weight | XV | XVI | XVII |
|---|---|---|---|
| Paratertiaryamylphenol | 2.3 | 4.0 | 4.0 |
| Dibutylphthalate | | | 3.0 |
| "Secondary butyl carbitol" | 4.6 | 8.0 | |
| Insecticide naphtha | 93.1 | 88.0 | 93.0 |
| Fly killing test: | | | |
| Method 223, Gulf: | | | |
| Number of tests | 11 | 11 | 8 |
| Number of flies | 835 | 817 | 710 |
| Average tests: | | | |
| Down, 10 min. percent | 98 | 99 | 99 |
| Killed, 24 hr. percent | 32 | 77 | 70 |
| Killed and moribund, 24 hr. percent | 43 | 87 | 76 |

In using secondary solvents in which para-tertiary-amyl-phenol is highly soluble, care should be exercised to avoid preparing concentrates which are so high in para-tertiary-amyl-phenol to be thrown out of solution when the concentrate is subsequently added to a naphtha or kerosene base.

In preparing live-stock spray oils, the procedure is essentially the same. For example, the following examples illustrate advantageous and effective live-stock spray oils prepared in accordance with our invention.

Example XVIII

| | Percent |
|---|---|
| Para-tertiary-amyl-phenol | 3.5 |
| Di-butyl phthalate | 3.5 |
| Live-stock spray oil | 93 |

Example XIX

| | Percent |
|---|---|
| Para-tertiary-amyl-phenol | 3.5 |
| Pine oil | 10.0 |
| Live-stock spray oil | 86.5 |

Example XX

| | Percent |
|---|---|
| Para-tertiary-amyl-phenol | 3.5 |
| Ortho di-chlorbenzene | 3.5 |
| Live-stock spray oil | 93.0 |

The live-stock spray oil base employed in making the above compositions, and which is typical of oils used for the purpose, had the following properties:

| | |
|---|---|
| Gravity, °A. P. I. | 35.4 |
| Viscosity, S. U. V. at 100° F. | 54 |
| Flash, O. C.; °F. | 320 |
| Fire, O. C.; °F. | 355 |
| Pour test, °F. | −25 |
| Color, N. P. A. | 1.0 |
| Iodin number (Mod. Hanus) | 6.9 |

The livestock spray set forth in the above Examples XVIII, XIX and XX were tested by the method described by A. E. Doty in "Soap," April 1936, page 97 and compared with a livestock spray oil containing 4 per cent of pyrethrum extract. In each case the livestock spray oils prepared in accordance with our invention, showed excellent repellency for 48 hours as compared with poor repellency for the pyrethrum base spray. In field test, our livestock spray oils were found not to be harmful to animals to which they were applied.

It will be obvious to those skilled in the art that our invention is not limited to the specific examples given hereinabove, by way of illustration and example, but may variously be employed and embodied within the scope of the claims hereinafter made.

As used in this application, the term "secondary butyl carbitol" is used to mean diethylene glycol monobutyl ether, and the term "butyl carbitol thiocyanate" means diethylene glycol monobutyl ether thiocyanate.

What we claim is:

1. An insecticidal spray comprising a mineral oil base, a minor quantity of para-tertiary-amyl-phenol, and an organic secondary solvent in amount sufficient to hold the para-tertiary-amyl-phenol solution in said base.

2. An insecticidal spray comprising a mineral oil base, a minor quantity of para-tertiary-amyl-phenol, a small quantity of a second insecticidal agent, and an organic secondary solvent in amount sufficient to hold the para-tertiary-amyl-phenol in solution in said base.

3. An insecticidal spray comprising a mineral oil base containing insecticidal materials extracted from pyrethrum, a minor quantity of para-tertiary-amyl-phenol, and an organic secondary solvent in amount sufficient to hold the para-tertiary-amyl-phenol in solution in said base.

4. An insecticidal spray comprising a mineral oil base, and minor quantities of para-tertiary-amyl-phenol and diethylene glycol monobutyl ether thiocyanate.

5. An insecticidal spray comprising a mineral oil base, minor quantities of para-tertiary-amyl-phenol, diethylene glycol monobutyl ether thiocyanate, and an organic secondary solvent in amount sufficient to maintain the para-tertiary-amyl-phenol in solution in said base.

6. An insecticidal spray comprising a mineral oil base, a minor quantity of para-tertiary-amyl-phenol and sufficient di-butyl-phthalate to hold the para-tertiary-amyl-phenol in solution in said base.

7. An insecticidal spray comprising a mineral oil base, a minor quantity of para-tertiary-amyl-phenol and sufficient diethylene glycol monobutyl ether to hold the para-tertiary-amyl-phenol in solution in said base.

MARK L. HILL.
BASSETT FERGUSON, Jr.